March 6, 1962     S. H. MICK     3,023,744
IDLE MIXTURE CONTROL AIR VALVE CARBURETOR
Filed Jan. 27, 1961     3 Sheets-Sheet 1

INVENTOR.
Stanley H. Mick
BY
R. P. Barnard
ATTORNEY

INVENTOR.
Stanley H. Mick
BY
R. P. Barnard
ATTORNEY

March 6, 1962  S. H. MICK  3,023,744
IDLE MIXTURE CONTROL AIR VALVE CARBURETOR
Filed Jan. 27, 1961  3 Sheets-Sheet 3

INVENTOR.
Stanley H. Mick
BY
C. P. Bernard
ATTORNEY

United States Patent Office 3,023,744
Patented Mar. 6, 1962

3,023,744
IDLE MIXTURE CONTROL AIR VALVE
CARBURETOR
Stanley H. Mick, St. Clair Shores, Mich., assignor to General Motors Corporation, Detroit, Mich., a corporation of Delaware
Filed Jan. 27, 1961, Ser. No. 85,403
5 Claims. (Cl. 123—119)

The present invention relates to a diaphragm operated carburetor of the type shown in my copending applications Serial No. 2,189, filed January 13, 1960, and Serial No. 65,451, filed October 27, 1960. The former is now Patent No. 2,996,051, granted August 15, 1961. More specifically, the present invention is an improvement in the aforenoted Mick applications in the provision of an improved idle mixture control device.

In the copending applications, the idle adjustment is regulated by bleeding air around the air valve so as to vary the pressure drop thereacross and in this manner to vary idle fuel flow. In these instances, a passage bypasses the air valve and the idle pressure drop across the air valve is regulated by a manually adjustable valve element.

The aforenoted type of idle adjustment is unsatisfactory for several reasons. First, the range of the idle mixture adjustment is small and not variable in accordance with engine temperature. Also a relatively fixed bleed around the air valve also affects off-idle operation.

These and other problems led to the development of the present idle mixture control device in which such mixture is automatically regulated in accordance with certain engine operating conditions.

More specifically, the present device includes a temperature responsive cam member for varying the degree of opening of the air valve during idling to vary the quantity of fuel metered. For instance, with the engine cold the air valve is permitted to close completely whereby a maximum metering signal is provided during cranking. On the other hand, when the engine is warm the air valve is opened slightly by the temperature controlled cam whereby the metering signal diminished and the fuel-air ratio leaned out.

The details as well as other objects and advantages of the present invention will be apparent from a perusal of the detailed description which follows.

Figure 1:
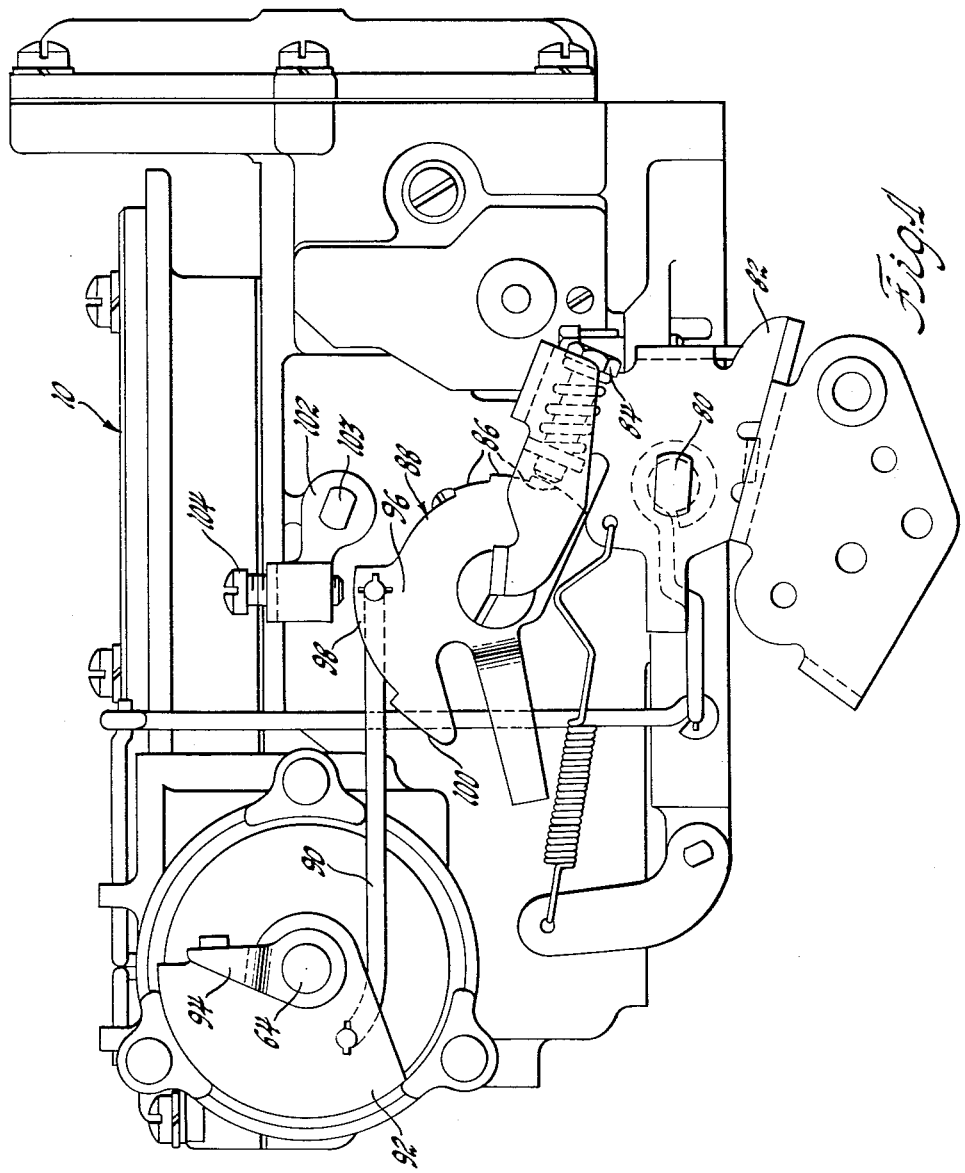
Figure 2:
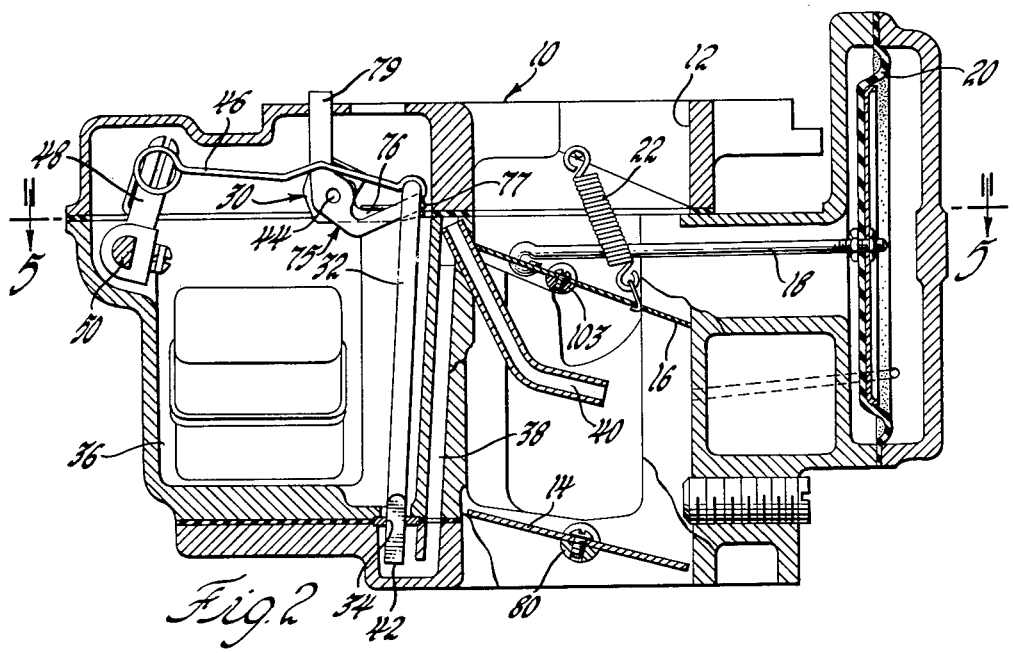
Figure 3:
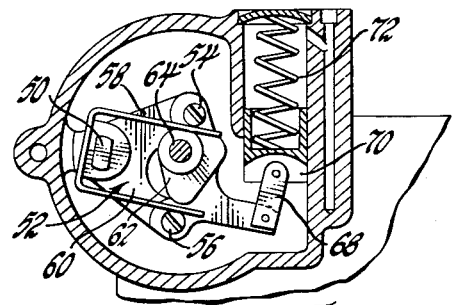
Figure 4:
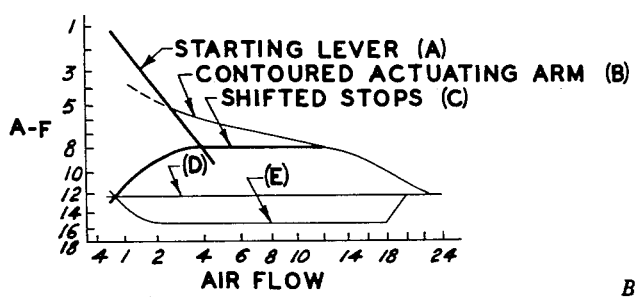
Figure 5:
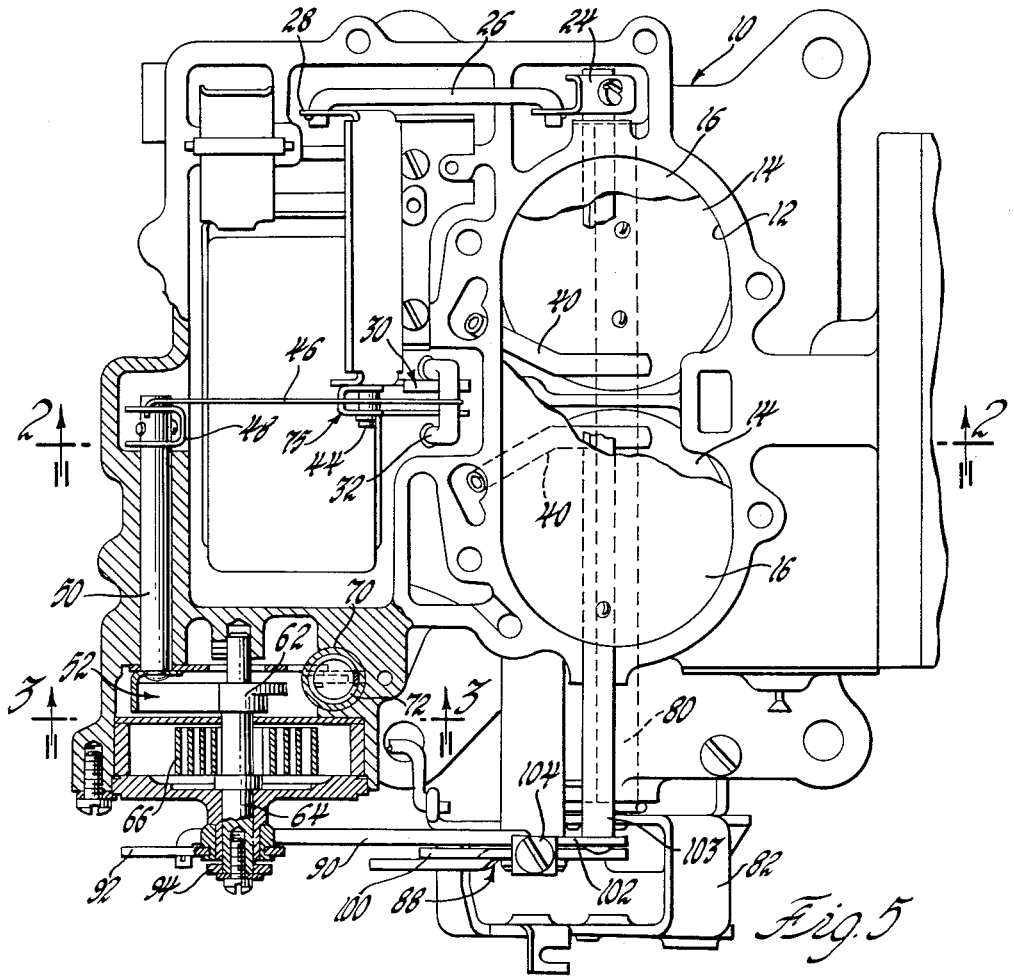
Figure 7:
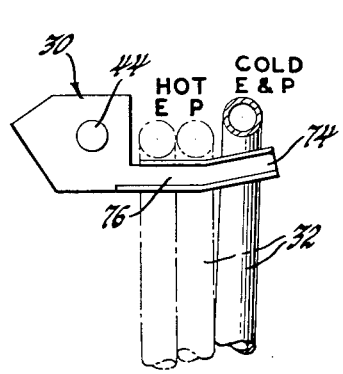
Figure 6:
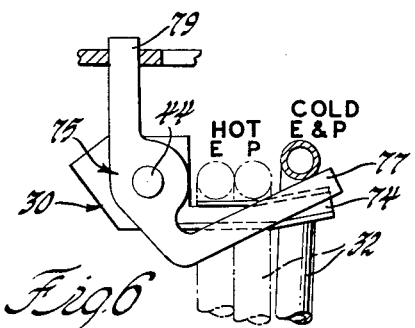

In the drawings:
FIGURE 1 is an elevational view of a carburetor embodying the subject invention;
FIGURE 2 is a sectional view along line 2—2 of FIGURE 5;
FIGURE 3 is a fragmentary elevational view of the thermostatic control mechanism;
FIGURE 4 graphically depicts the fuel-air ratio effect of the subject invention;
FIGURE 5 is a plan view along line 5—5 of FIGURE 2;
FIGURE 6 is an enlarged view of the starting lever and actuating arm; and
FIGURE 7 shows the metering rod controlling lever with the metering rods represented in different operating conditions.

The carburetor is indicated generally at 10 and includes an induction passage 12 in which a throttle valve 14 is rotatably disposed. An air valve 16 is also rotatably disposed in induction passage 12 anteriorly of throttle 14 and is articulated through a rod 18 to a diaphragm 20. A light spring 22 urges air valve 16 in a closed direction. Basic to all air valve type carburetors, the angular position of air valve 16 is varied to maintain a constant pressure drop thereacross under all air flow conditions. The control of the angular position of the air valve is determined by diaphragm 20 the left side of which communicates with the induction passage anteriorly of the air valve and the right side of which communicates with the induction passage immediately posterior of the air valve. Thus as air flow increases through the induction passage, in accordance with engine demand, the pressure drop across the air valve would also tend to increase. This increased pressure differential is translated into a rightward movement of diaphragm 20 occasioning a further opening of air valve 16 until the pressure drop thereacross is once again stabilized.

With the increased air flow through induction passage 12, it is necessary to increase the quantity of fuel flow in order to maintain a substantially constant fuel-air ratio. Accordingly, air valve 16 includes a lever 24 fixed thereto which connects through a link 26 with a pivotally mounted lever 28. Lever 28, in turn, is fixed to an actuating arm indicated generally at 30 which is adapted to coact with U-shaped metering rods 32. Metering rods 32 are adapted to be lifted out of fuel metering orifices 34 progressively with increased opening movement of air valve 16. Metering orifices 34, in turn, communicate fuel reservoir 36 with a passage 38 in the upper end of which a fuel discharge tube 40 is disposed. As air flow increases past the tube 40, fuel will be induced to flow through orifices 34 in a quantity determined by the position of the tapered ends 42 therewithin.

As thus far described, it is apparent that as air flow increases through induction passage 12, air valve 16 will be increasingly opened by diaphragm 20 causing metering rods 32 to increase fuel flow.

Arm 30 rotates about a shaft 44 in accordance with air valve actuation as already described. As the point of radial contact of metering rods with arm 30 is varied, so will the movement of the tapered ends 42 of the metering rod relative to metering orifices 34 be varied. This radial movement is utilized to provide variations in the fuel-air ratio to meet certain operating requirements of the engine. The means whereby the fuel-air ratio is thus varied will now be considered in greater detail.

As in the aforenoted copending applications, temperature and manifold vacuum responsive means are provided for moving metering rods 32 radially relative to pivot axis 44 of arm 30. This radial movement of metering rods 32 is achieved by securing one end of a relatively stiff wire member 46 to the closed upper end of metering rods 32 with the other end of wire 46 being secured to a lever 48 fixed to shaft 50. The other end of shaft 50 has a bifurcated lever 52 secured thereto. Bifurcated lever 52 includes power and economy stops 54 and 56 respectively mounted on arms 58 and 60 thereof. A warm-up cam member 62 is disposed between arms 58 and 60 and is fixed to a shaft 64 which is adapted to be rotated by a coiled bimetal member 66. Thus with the engine cold, the cam is in the position shown in FIGURE 2 which causes lever 52, shaft 50, lever 48 and wire 46 to move the upper end of metering rods 32 radially away from pivot axis 44 of arm 30 whereby any rotation of the latter lever will occasion maximum fuel flow through metering orifices 34 for any particular position of air valve 16. As engine temperature warms, cam 62 is rotated in a counterclockwise direction which also imparts a similar rotation to lever 52 which in turn occasions a movement of the upper end of metering rods 32 toward pivot axis 44 of arm 30 to thereby decrease or lean out the fuel-air ratio.

Bifurcated lever 52 is also articulated through a link 68 to a vacuum piston 70 which is suitably connected with a source of manifold vacuum which tends to urge the lever in a counterclockwise direction against the force of a spring 72. Thus under normal operating conditions, manifold vacuum will rotate bifurcated lever 52 until the economy stop 56 is brought into engagement with cam 62. Under these conditions, maximum fuel economy is realized. On the other hand, under conditions of high power demand, the manifold vacuum acting on vacuum piston 70 will decrease sufficiently to permit spring 72 to move bifurcated lever 52 in a clockwise direction to bring power stop 54 into engagement with cam 62 which in turn increases the fuel-air ratio until the power demand is met.

The metering rod control arm of the aforenoted copending application was basically straight or flat and temperature controlled variations in the fuel flow between metering rods 32 and metering orifices 34 were determined solely by changes in the radial distance between the pivot point of the lever and the metering rod. This type of operation is, however, inadequate for cold starting and enrichment purposes, as seen by referring to curve C of FIGURE 4. Curve C indicates the extremely lean fuel-air ratios under low air flow conditions with the previous flat or straight metering control lever. This is to be compared with the rich fuel-air ratios during cold start and running represented by curves A and B, infra.

Accordingly, the metering rod control lever 30 has been modified to provide a contoured or inclined end portion 74 and inclined starting lever 75 also added. Lever 75 and inclined portion 74 are operative solely under cold starting and warm-up conditions to increase fuel flow through the extended retraction of the tapered ends 42 of metering rods 32 from metering orifices 34.

Starting lever 75 is supported upon shaft 44 and retained against movement by an arm 79 projecting upwardly from the lever through an opening in the carburetor cover casing.

Referring to FIGURES 6 and 7, metering rods 32 are shown in various operative positions. In this representation, numerals "E" and "P" refer to the "economy" or "power" positions of bifurcated lever 52. When the engine is cold, bimetal 66 will have moved the metering rods to the "cold" position, FIGURE 5, in which the rods will have been moved up inclined portion 77 of starting lever 75 to retract tapered ends 42 from metering orifices 34 to maximize fuel flow for any particular angular position of air valve 16. Thereafter as the engine warms, rods 32 will progressively move down inclined arm portion 77 following fuel-air ratio curve A of FIGURE 3.

While starting lever 75 considerably improves cold starting and running operation, the fuel-air ratio proves to be slightly lean at higher air flow. To cover this period of operation, indicated between approximately 2 and 14 lbs./min., inclined portion 74 of lever 30 is provided and duly picks up metering rods 32 whereby the fuel-air ratio now follows curve B.

As the engine becomes fully warmed, metering rods 32 are moved to the flat portion 76 of lever 30 and the fuel-air ratio follows either power or economy curves D or E.

Thus with the engine cold and the metering rods on inclined arm portion 74, any radial movement of the rods under the influence of bimetal 66 will also be accompanied by limited circumferential movement. On the other hand, after bimetal 66 has moved the metering rods to the flat portion 76 of arm 30, indicative of a warm engine, only radial movement of the rods between the "E" and "P" positions will occur and this solely under the influence of vacuum piston 70 to provide economy or power fuel flow.

Thus, in the preferred embodiment of the invention, the fuel-air ratio "curve" is tailored to engine needs by providing inclined starting lever 75 and contoured or inclined portion 74 of lever 30. It is to be understood, however, that other variations of the basic "inclining-lever" concept are possible. For instance, it would be possible to incline starting lever 75 in such a way as to approximate the desired fuel-air ratio represented by curves A and B. In this event, it would be unnecessary to incline metering arm 30.

Referring now to FIGURES 1 and 5, throttle shaft 80 has a lever 82 fixed thereto and which lever includes an adjustable stop member 84. As described in copending application Serial No. 2,189, stop member 84 is adapted to coact with the steps 86 of a fast idle cam member 88. Cam 88 is, in turn, connected to bimetal 66 through link 90, unbalanced weight 92 and lever 94 fixed to shaft 64. Thus when the engine is cold the parts are in the positions of FIGURE 1. In this case, throttle stop 84 abuts against the highest of the steps 86 to open the throttle and insure increased engine speed for cold idling.

In the present invention, an additional cam portion 96 is formed on fast idle cam 88. Cam portion 96 includes low and high steps 98 and 100.

A lever 102 is fixed to air valve shaft 103 and includes an adjustable stop member 104 adapted to coact with steps 98 and 100. With the engine cold, cam portion 96 is positioned as shown in FIGURE 1 in which case the air valve is completely closed by spring 22. With the air valve closed the maximum cranking signal will be transmitted to the right side of diaphragm 20 and metering rod 32 positioned, as shown in FIGURE 2, to maximize idle fuel flow.

As the engine warms, bimetal 66 rotates lever 94 in a counterclockwise direction permitting weight 92 to fall by gravity imparting a clockwise rotation to fast idle cam 88. When the engine is fully warmed, high step 100 of cam portion 96 is disposed beneath air valve stop member 104. In the event the engine is now idled, stop 104 will engage step 100 preventing air valve 16 from fully closing. Thus, by maintaining the air valve partially open during idling the pressure drop thereacross is diminished which, in turn, diminishes or leans out idle fuel flow.

Air valve stop 104 may be adjusted relative to its supporting lever 102 to engage high step 100 and thereby provide the desired mixture for warm idle operation.

It is important that the fast idle cam 88 and air valve controlling steps 98—100 be operated by the same temperature responsive member 66. While in the preferred form the fast idle cam and air valve step are made from the same piece, they could be separate elements connected for coordinated operation by a single temperature responsive element. This accurately coordinated operation is necessary because the air valve controlling step 100 is required to open the valve only when the engine is idled on the lowest step of the fast idle cam (hot idle speed) and must be out of position to engage stop screw 104 at all other fast idle cam positions.

I claim:

1. A charge forming device for an internal combustion engine comprising an induction passage, a throttle valve rotatably mounted in said induction passage, an air valve rotatably mounted in said induction passage anteriorly of said throttle valve, a servo device operatively connected to and adapted to control the position of said air valve in accordance with the pressure drop across the air valve, conduit means for supplying fuel to said induction passage, means operatively connected to said air valve for controlling fuel flow through said conduit means, and engine temperature responsive means for varying the degree of opening of said air valve during engine idling conditions.

2. A charge forming device for an internal combustion engine comprising an induction passage, a throttle valve rotatably mounted in said induction passage, an air valve rotatably mounted in said induction passage anteriorly of said throttle valve, a servo device operatively connected to and adapted to control the position of said air valve in accordance with the pressure drop across the air valve, conduit means for supplying fuel to said induction passage, means operatively connected to said air valve for controlling fuel flow through said conduit means, an engine temperature responsive cam member, a lever fixed to said air valve, and an adjustable stop mounted on said lever and adapted to engage said cam member to vary the degree of opening of said air valve during engine idling conditions.

3. A charge forming device for an internal combustion engine comprising an induction passage, a throttle valve rotatably mounted in said induction passage, an air valve rotatably mounted in said induction passage anteriorly of said throttle valve, a servo device operatively connected to and adapted to control the position of said air valve in accordance with the pressure drop across the air valve, a source of fuel, conduit means communicating said fuel source with said induction passage intermediate said air and throttle valves, a metering orifice in said conduit means, a metering rod adapted to coact with said metering orifice to control the quantity of fuel flow therethrough, said metering rod being adjustably connected to said servo device whereby fuel flow through the metering orifice is proportional to the degree of opening of said air valve, means for varying the adjustable connection between the metering rod and said servo device to vary the fuel flow rate through said metering orifice in accordance with certain engine operating conditions, an engine temperature responsive cam member, a lever fixed to said air valve, and an adjustable stop mounted on said lever and adapted to engage said cam member to vary the degree of opening of said air valve during engine idling conditions.

4. A charge forming device as set forth in claim 3 in which said cam member includes a first surface permitting said air valve to fully close during cold engine idling operation and a second surface preventing the air valve from fully closing during warm engine idling operation.

5. A charge forming device as set forth in claim 1 in which said temperature responsive means also controls the degree of throttle valve opening during engine idling conditions.

No references cited.

Disclaimer 3,023,744.—*Stanley H. Mick*, St. Clair Shores, Mich. IDLE MIXTURE CONTROL AIR VALVE CARBURETOR. Patent dated Mar. 6, 1962. Disclaimer filed Feb. 26, 1964, by the assignee, *General Motors Corporation*.

Hereby enters this disclaimer to claim 1 of said patent.

[*Official Gazette May 12, 1964.*]

Notice of Adverse Decision in Interference

In Interference No. 93,323 involving Patent No. 3,023,744, S. H. Mick, Idle mixture control air valve carburetor, final judgment adverse to the patentee was rendered Jan. 30, 1964, as to claim 1.
[*Official Gazette December 22, 1964.*]